(12) United States Patent
Yang

(10) Patent No.: US 7,876,762 B2
(45) Date of Patent: Jan. 25, 2011

(54) ETHERNET SERVICE CONFIGURATION DEVICE, METHOD, AND SYSTEM IN PASSIVE OPTICAL NETWORK

(75) Inventor: Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 12/391,031

(22) Filed: Feb. 23, 2009

(65) Prior Publication Data

US 2009/0154920 A1 Jun. 18, 2009

Related U.S. Application Data

(63) Continuation of application No. PCT/CN2007/070554, filed on Aug. 24, 2007.

(30) Foreign Application Priority Data

Aug. 25, 2006 (CN) .................. 2006 1 0111838

(51) Int. Cl.
*H04L 12/28* (2006.01)
(52) U.S. Cl. .................. 370/395.3; 370/419; 398/167
(58) Field of Classification Search .................. None
See application file for complete search history.

(56) References Cited

U.S. PATENT DOCUMENTS

| 7,120,139 | B1 * | 10/2006 | Kung et al. .................. 370/352 |
| 2004/0109688 | A1 | 6/2004 | Kim et al. |
| 2004/0114592 | A1 | 6/2004 | Kang et al. |
| 2005/0157732 | A1 * | 7/2005 | Joy et al. .................. 370/401 |
| 2005/0169631 | A1 | 8/2005 | Thinguldstad |

(Continued)

FOREIGN PATENT DOCUMENTS

CN 1507206 6/2004

(Continued)

OTHER PUBLICATIONS

G.984.4: Gigabit-capable Passive Optical Networks (G-PON): ONT management and control interface specification, Series G: Transmission Systems and Media, Digital Systems and Networks, ITU-T Standard in Force (I), Jun. 13, 2004, p. 6-25, XP017401197, International Telecommunication Union, Geneva, Switzerland.

(Continued)

*Primary Examiner*—Chirag G Shah
*Assistant Examiner*—Salvador E Rivas
(74) *Attorney, Agent, or Firm*—Leydig, Voit & Mayer, Ltd.

(57) ABSTRACT

An Ethernet service configuration device, method, and system in a passive optical network (PON) are provided. The device includes a PON protocol processing module, an Ethernet module, and at least one service module based on Ethernet which are sequentially connected. The Ethernet module includes a media access control (MAC) bridge port configuration data management entity (ME) and an Ethernet service termination point ME connected with each other. The service module based on Ethernet includes at least one non-Ethernet service functional termination point ME correlated with the Ethernet service termination point ME. According to the device, method, and system, the coupling between Ethernet service configuration and all kinds of service and/or device configurations based on Ethernet is reduced, which is propitious to the ONT maintenance and modularization configuration.

14 Claims, 6 Drawing Sheets

U.S. PATENT DOCUMENTS

2006/0198389 A1* 9/2006 Eriokson et al. ............ 370/466
2009/0154920 A1* 6/2009 Yang ........................... 398/17

FOREIGN PATENT DOCUMENTS

| EP | 1416761 | 5/2004 |
|---|---|---|
| JP | 2001160820 | 6/2001 |
| WO | WO-2005115043 | 12/2005 |

OTHER PUBLICATIONS

Khermosh, L., Managed Objects of EPON draft-ietf-hubmib-efm-epon-mib-05.txt, IETF Standard-Working-Draft, Jul. 23, 2006, p. 1-95, XP015046736, vol. hubmib, No. 5, Internet Engineering Task Force.

Xie, Yongfeng, et al., "OAM Protocol Principle and Design Proposal in EPON," Optical Communication Technology, Oct. 2005, p. 38-40, No. 10.

Mou, Huixian, et al., "Study on the OAM Sublayer of EPON System," Study on Optical Communications, Oct. 2005, p. 32-34, 67, No. 5.

* cited by examiner

ETHERNET SERVICE CONFIGURATION DEVICE, METHOD, AND SYSTEM IN PASSIVE OPTICAL NETWORK

CROSS REFERENCE TO RELATED APPLICATIONS

The application is a continuation application of PCT/CN2007/070554, filed on Aug. 24, 2007, which claims the benefit of priority to Chinese Patent Application No. 200610111838.3, entitled "Ethernet service configuration device, method, and system in passive optical network" and filed on Aug. 25, 2006, both of which are incorporated herein by reference in their entirety.

FIELD OF THE TECHNOLOGY

The present disclosure relates to a service and/or device configuration technology in a passive optical network (PON), and more particularly to an Ethernet service configuration device, method, and system in a PON.

BACKGROUND OF THE DISCLOSURE

At present, broadband access technologies are mainly categorized into a copper access technology and an optical access technology. An access network implemented by the optical access technology is called an optical access network (OAN). The PON is a point to multi-point transport technology for implementing the OAN. A basic structure of the PON is shown in FIG. 1. The PON includes an optical line terminal (OLT), an optical distribution network (ODN), and optical network units (ONUs). In FIG. 1, the ONU is represented by an optical network terminal (ONT).

The OLT provides a service network interface (SNI) for the OAN and is connected to one or more ODNs. The ODN, a passive optical splitter, transmits downlink data of the OLT to each ONU through optical division, and transmits uplink data of the ONUs to the OLT through convergence. An ONU provides a user-network interface (UNI) for the OAN and is connected to the ODN. The ONU may be called an ONT if the ONU also provides a service interface, such as an Ethernet user port or a plain old telephone service (POTS) port. In the description, both an ONU and an ONT are referred to as an ONT for convenience.

In the PON, the downlink traffic of the OLT is broadcasted to the ONTs by means of time-division multiplexing (TDM), and each of the ONTs receives the downlink traffic as required. Moreover, the OLT manages the uplink traffic of the ONTs, and a specific ONT is allowed to transmit data to the OLT at a particular time by means of time division multiple access (TDMA).

FIG. 2 is a schematic structural view of an ONT supporting Ethernet services in the prior art. Referring to FIG. 2, the ONT includes an Ethernet module, at least one service module based on Ethernet, and a PON protocol processing module.

The PON protocol processing module is adapted to perform PON standard protocol related operations, for example, receiving the OLT configuration information to configure the ONT, reporting the status of the ONT or making an alarm, adding a PON protocol frame header to an uplink packet received by the Ethernet module, or removing a PON protocol frame header from a downlink frame, and then reassembling and sending the frame to the Ethernet module.

The Ethernet module is adapted to perform operations related to the Ethernet frame processing, maintenance, and management, such as adding a virtual local area network (VLAN) tag, or filtering packets based on VLAN tags or media access control (MAC) addresses.

The service module based on Ethernet is adapted to perform functions related to its own service processing, maintenance, and management, such as the recovery of a TDM service module clock based on Ethernet.

The service module based on Ethernet provides a UNI, and is connected to the Ethernet module through an internal UNI provided by the Ethernet module.

In the ONT, a certain port of the Ethernet module only provides Ethernet services instead of services over Ethernet, and thus the internal UNI functions as the UNI of the ONT.

The ONT based on Ethernet services supports various service functions over Ethernet, for example, TDM services based on Ethernet or Internet protocol (IP) routing services.

International Telecommunication Union (ITU-T) defines Broadband Passive Optical Network (BPON) technology G.983.x serial standards and Giga-bit Passive Optical Network (GPON) technology G.984.x serial standards. In the BPON or GPON technology, the configuration and management modes of ONTs by an OLT are defined. In particular, the OLT manages and configures each ONT through an ONT management control interface (OMCI). The OMCI is a configuration transmission channel built between the OLT and each ONT in the BPON or GPON, and established when the ONT is registered to the OLT. Further, the OMCI adopts a master-slave management protocol, in which the OLT is a master device, the ONTs are slave devices, and the OLT controls multiple ONTs connected thereto through the OMCI channels.

The OMCI abstracts various data of the management and configuration of the ONTs by the OLT into an independent management information base (MIB) with management entities (MEs) as its basic units. In the BPON or GPON, the OLT is defined to control various MEs of each ONT through the OMCI. Under the control of the OLT, the ONT implements the configuration and management of each ME. The OMCI is meant to permit the provision of modularization and expandability to satisfy the control and management of different ONTs.

FIG. 3 is a schematic view of an Ethernet service configuration device employing MEs in the prior art. Referring to the figure, a MAC bridge port configuration data ME is set in an Ethernet module of an ONT. An Ethernet flow termination point ME and a pseudo wire termination point ME connected with each other are set in a service module based on Ethernet. The pseudo wire termination point ME is further connected to the MAC bridge port configuration data ME.

The MAC bridge port configuration data ME is adapted to configure data related to a MAC bridge port, for example, parameters about the port priority, port path value, and termination point pointer. The pseudo wire termination point ME defines to transmit TDM service configuration data in the form of data packets. The configuration data includes structured/unstructured service-type attributes and signaling bearer modes. The Ethernet flow termination point ME is adapted to configure parameters required for ending/initiating an Ethernet data frame, such as MAC addresses of the ONTs, remote MAC addresses, and strategies of adding VLAN tags to an uplink frame.

Referring to FIG. 3, the MAC bridge port configuration data ME in the Ethernet module is directly connected to the pseudo wire termination point ME in the service module based on Ethernet. The MAC bridge port configuration data ME may only configure data related to the MAC bridge port, such as parameters about the port priority, port path value, and termination point pointer, instead of configuring a loop-back detection function. That is, the MAC bridge port configuration data ME is unable to detect channel faults of an internal UNI through loop-backs, and thus the loop-back detection function has to be configured by an termination point ME of a certain type of service. In FIG. 3, the loop-back detection function is not defined in the MAC bridge port configuration data ME. When an Ethernet physical interface is directly provided by the Ethernet service module, an physical path termination point Ethernet UNI ME correlated with the MAC bridge port configuration data ME provides a loop-back detection function. However, the device in FIG. 3 does not have the above function, and is thus incapable of performing the loop-back fault detection.

Referring to FIG. 3, the Ethernet flow termination point ME defines some attributes configured to process the Ethernet data. However, the Ethernet flow termination point ME is directly correlated with the pseudo wire termination point ME instead of the MAC bridge port data ME, i.e., the ME that should be employed to configure the Ethernet data attributes is set in the service module based on Ethernet, and is uncorrelated with the Ethernet module. Thus, the device in FIG. 3 deviates from the design principle of modularization. As a result, a close coupling between the Ethernet service configuration and all kinds of service and/or device configurations based on Ethernet is generated, and the ONT maintenance and modularization configuration will be affected.

SUMMARY OF THE INVENTION

Accordingly, embodiments of the present disclosure provide an Ethernet service configuration device and system in a PON, so as to reduce the coupling between Ethernet service configuration and all kinds of service and/or device configurations based on Ethernet, thus facilitating the ONT maintenance and modularization configuration.

Embodiments of the present disclosure further provide an Ethernet service configuration method in a PON, so as to reduce the coupling between Ethernet service configuration and all kinds of service and/or device configurations based on Ethernet, thus facilitating the ONT maintenance and modularization configuration.

The technical schemes illustrated in embodiments of the present disclosure are as follows.

A PON element includes a PON protocol processing module, an Ethernet module, and at least one service module based on Ethernet which are sequentially connected. The Ethernet module includes a MAC bridge port configuration data ME and an Ethernet service termination point ME connected with each other. The service module based on Ethernet includes at least one non-Ethernet service functional termination point ME correlated with the Ethernet service termination point ME.

The MAC bridge port configuration data ME is adapted to configure a MAC bridge port.

The Ethernet service termination point ME is adapted to configure attributes for ending or initiating an Ethernet service.

The non-Ethernet service functional termination point ME is adapted to configure attributes of a service over Ethernet.

An Ethernet service configuration method in a PON includes the following steps.

An Ethernet service termination point ME is set in an Ethernet module of a PON element, and at least one non-Ethernet service functional termination point ME is set in a service module based on Ethernet of the PON element. The non-Ethernet service functional termination point ME in the service module based on Ethernet is correlated with the Ethernet service termination point ME.

The Ethernet service termination point ME performs an attribute configuration related to the ending or initiation of an Ethernet service of an ONT. The non-Ethernet service functional termination point ME performs an attribute configuration on a service over Ethernet of the PON element. The MAC bridge port configuration data ME performs an attribute configuration on the MAC bridge port of the ONT.

A PON system includes an OLT and at least one PON element connected with each other. The PON element has an Ethernet service termination point ME and a non-Ethernet service functional termination point ME correlated with each other.

The PON element is adapted to configure attributes for ending or initiating an Ethernet service according to the Ethernet service termination point ME, and configure attributes of a service over Ethernet according to the non-Ethernet service functional termination point ME.

In the embodiments of the present disclosure, the Ethernet service termination point ME adapted to configure attributes for ending or initiating an Ethernet service is set in the Ethernet module of the ONT, i.e., set between the MAC bridge port configuration data ME and the non-Ethernet service functional termination point ME in the service module based on Ethernet. Thereby, the Ethernet service termination point ME enables the Ethernet module to complete attribute configurations of all the Ethernet services, and the non-Ethernet service functional termination point ME enables the service module based on Ethernet to complete attribute configurations of all the other services over Ethernet. Therefore, the device, method, and MEs provided in the embodiments of the present disclosure reduce the coupling between Ethernet service configuration and all kinds of service and/or device configurations based on Ethernet, and further facilitate the ONT maintenance and modularization configuration. Moreover, as the Ethernet service termination point ME is set between the MAC bridge port configuration data ME and the non-Ethernet service functional termination point ME in the service module based on Ethernet, an Ethernet loop-back configuration can be set at the Ethernet service termination point ME, thereby realizing the loop-back fault detection on the UNI and the MAC bridge port.

BRIEF DESCRIPTION OF THE DRAWINGS

The present disclosure is further described in detail as follows by reference to the accompanying embodiments and drawings, among which.

DETAILED DESCRIPTION OF THE EMBODIMENTS

In order to make the objectives, technical schemes, and beneficial effects of the present disclosure better understood, embodiments accompanied with figures are described in detail below.

Figure 1:
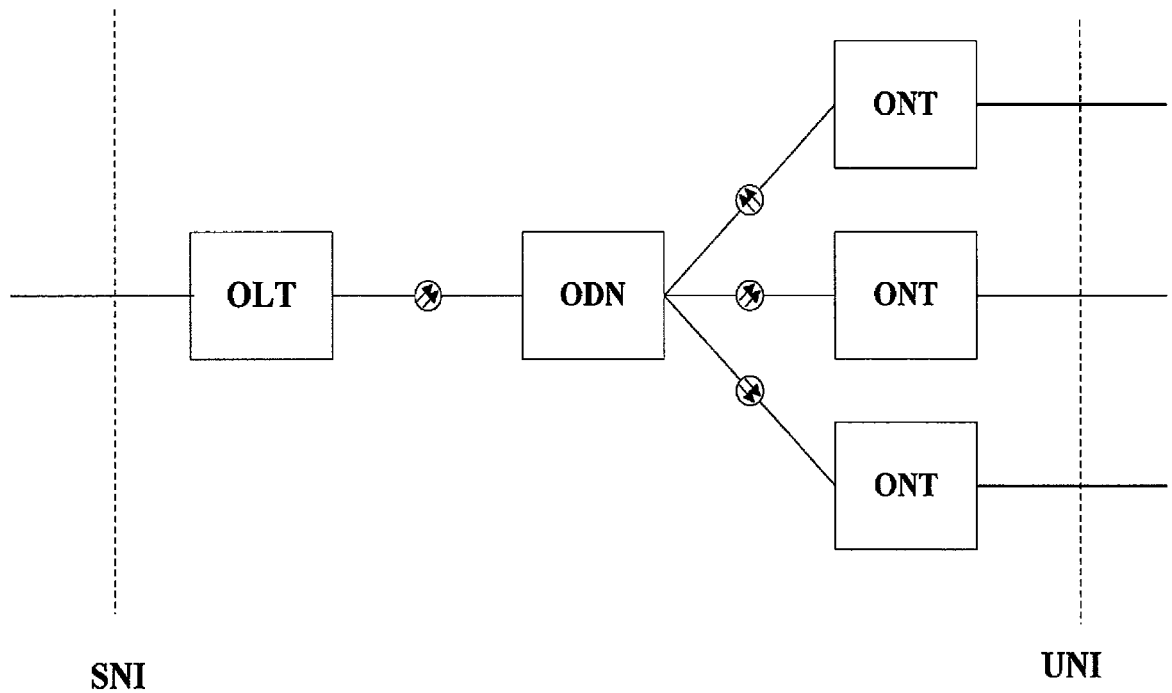
FIG. 1 is a schematic structural view of a PON in the prior art.
Figure 2:
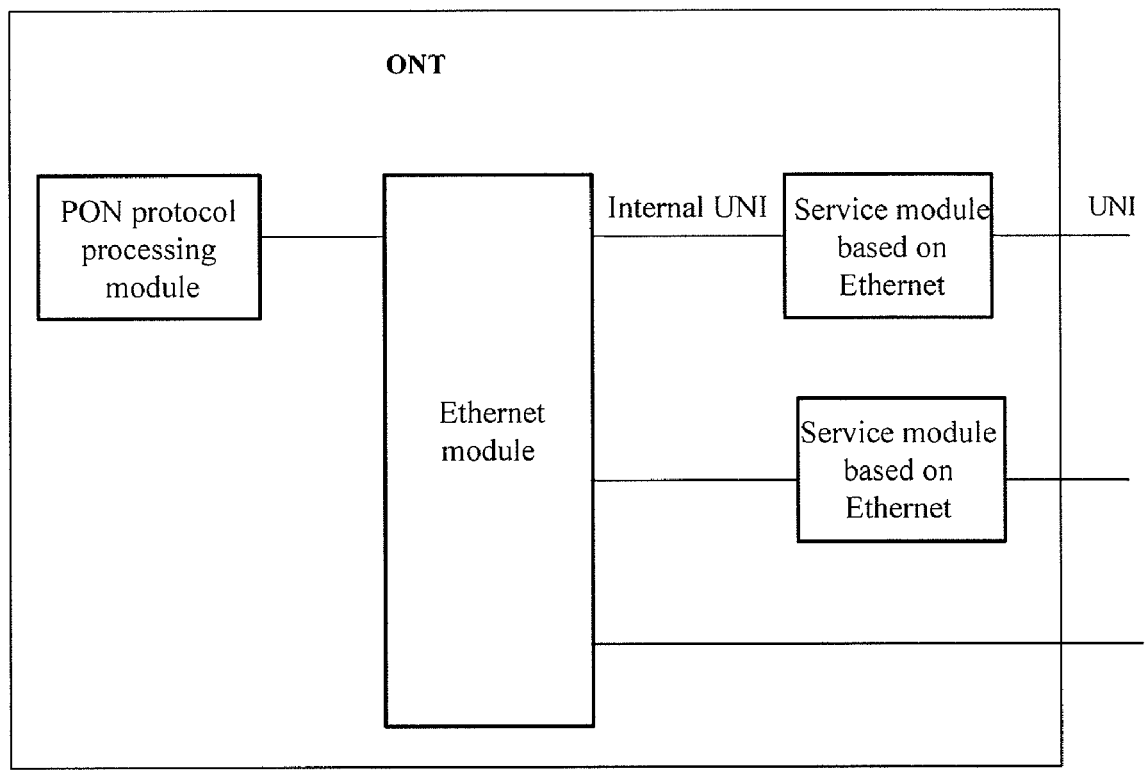
FIG. 2 is a schematic structural view of an ONT supporting Ethernet services in the prior art.
Figure 3:
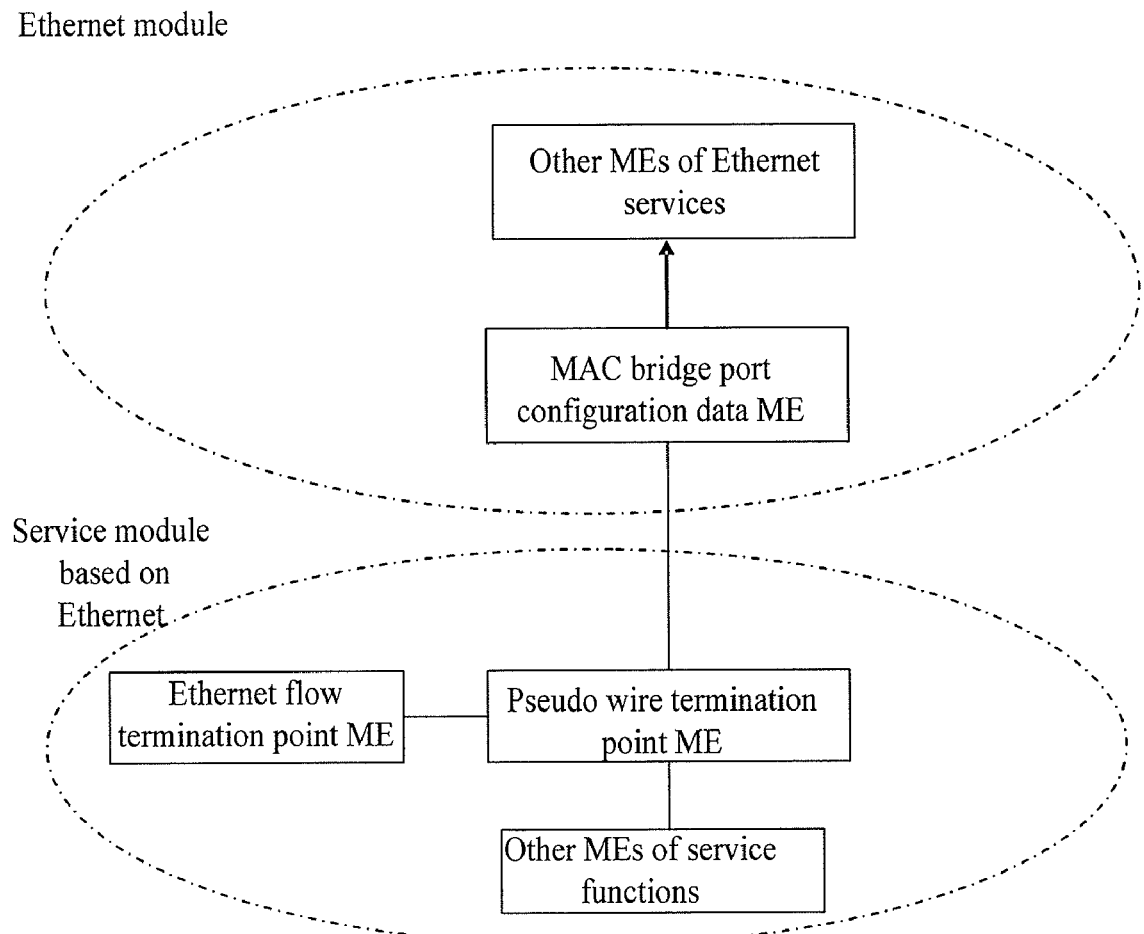
FIG. 3 is a schematic view of an Ethernet service configuration device employing MEs in the prior art.

Referring to FIG. 2, the physical structure of an ONT is actually modularized, i.e., an Ethernet module is separated from a service module based on Ethernet. However, in the prior art, the Ethernet service termination point ME adapted for Ethernet service configuration is set in the service module based on Ethernet, such that the ONT modularization design and/or configuration may not be realized. Therefore, the device, method, and MEs provided in the embodiments of the present disclosure regard the service module based on Ethernet as a service provision device. In this manner, the service module based on Ethernet is loosely coupled to the Ethernet module, so as to reduce the coupling between Ethernet service configuration and all kinds of service and/or device configurations based on Ethernet, and further facilitate the ONT maintenance and modularization configuration.

Figure 4:
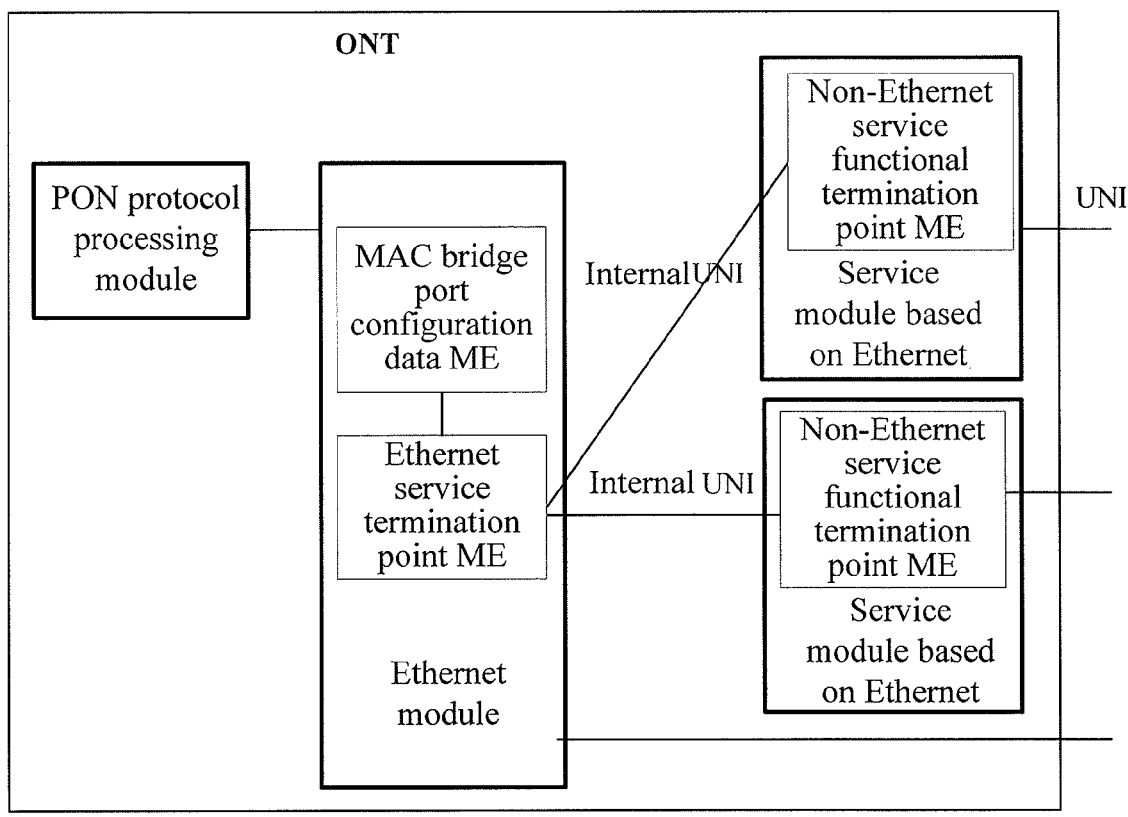
FIG. 4 is a schematic view of an Ethernet service configuration device in a PON according to an embodiment of the present disclosure.

FIG. 4 is a schematic view of an Ethernet service configuration device in a PON according to an embodiment of the present disclosure. In the figure, the device is an ONT including a PON protocol processing module, an Ethernet module, and at least one service module based on Ethernet that are sequentially connected. The Ethernet module is connected to the at least one service module based on Ethernet through an internal interface (for example, an internal UNI), and the service module based on Ethernet is connected to an external user terminal through a UNI.

In an embodiment of the present disclosure, a MAC bridge port configuration data ME and an Ethernet service termination point ME connected with each other are set in the Ethernet module. At least one non-Ethernet service functional termination point ME is set in the service module based on Ethernet. The non-Ethernet service functional termination point ME is connected to the Ethernet service termination point ME in the Ethernet service module.

The Ethernet service termination point ME has functions similar to the Physical path termination point Ethernet UNI ME. The Ethernet service termination point ME is connected to the service module based on Ethernet through an internal interface (for example, an internal UNI). The Ethernet service termination point ME is correlated with the non-Ethernet service functional termination point ME in the service module based on Ethernet in an explicit or implicit mode. In the explicit mode, the Ethernet service termination point ME is linked to the correlated non-Ethernet service functional termination point ME through a pointer, or the non-Ethernet service functional termination point ME in the service module based on Ethernet is linked to the Ethernet service termination point ME through a pointer. In the implicit mode, the Ethernet service termination point ME is correlated with the non-Ethernet service functional termination point ME through ME identities. In practice, the two MEs are correlated with identical identities.

In an embodiment of the present disclosure, the non-Ethernet service functional termination point ME is adapted to support the transmission of non-Ethernet services over Ethernet in GPON packet transmission. The non-Ethernet service functional termination point ME serves as a TDM service termination point ME or a pseudo wire termination point ME. When the non-Ethernet service functional termination point ME is a pseudo wire termination point ME, the non-Ethernet service functional termination point ME is adapted to support the transmission of TDM services over Ethernet in GPON.

The Ethernet service termination point ME is adapted to configure parameters required for ending/initiating an Ethernet data frame, such as MAC addresses of the ONTs, remote MAC addresses, and strategies of adding VLAN tags to an uplink frame, or is adapted to configure a loop-back detection function, for example, a loop-back fault detection from an internal interface (for example, the internal UNI) to a non-Ethernet service functional module, i.e., a downlink loop-back, and/or a loop-back fault detection to a MAC bridge port, i.e., an uplink loop-back.

An example is given below for illustration.

The Ethernet service termination point ME is an ME connecting the Ethernet module and the service module based on Ethernet. At the Ethernet service termination point ME, in the uplink direction, a data bit stream from the service module based on Ethernet is configured into Ethernet data and then sent out. In the downlink direction, data analyzed from the Ethernet data at the Ethernet service termination point ME is composed into a data bit stream to be sent to the service module based on Ethernet.

The Ethernet service termination point ME has various application examples. Each application example is set by the ONT under the request of the OLT. When data is transmitted between the service module based on Ethernet and the Ethernet module, an application example is set.

Each application example of the Ethernet service termination point ME is identified by attributes including ME identity, termination point interconnection pointer, and Ethernet service loop-back configuration.

The ME identity is unique to each application example. This attribute, set during the configuration of an application example, takes up 2 bytes and can only be read.

The termination point interconnection pointer provides an application example having a pointer toward the non-Ethernet service functional termination point ME in the service module based on Ethernet. The non-Ethernet service functional termination point ME is a pseudo wire termination point ME or an MoCA (Multimedia over Coax Alliance) termination point ME. This attribute, set during the configuration of an application example, takes up 2 bytes and can be read/written.

The Ethernet service loop-back configuration is adapted to configure a loop-back detection function for Ethernet services. When the value of this attribute is 0x00, the loop-back detection will not be performed. When the value of this attribute is 0x01, a downlink loop-back is performed. That is, a data bit stream received from a non-Ethernet service functional termination point ME in the service module based on Ethernet is looped back, so as to implement the loop-back fault detection on the UNI. Further, when the value of this attribute is 0x02, an uplink loop-back is performed. That is, an Ethernet data received from a MAC bridge port is looped back, so as to implement the loop-back fault detection between the MAC bridge port configuration data MEs. This attribute, set during the configuration of an application example, takes up one byte and can be read/written.

Definitely, other attributes can be set in the Ethernet service termination point ME or these attributes are added or deleted upon requirements as desired.

In an embodiment of the present disclosure, an Ethernet service termination point ME is newly set, and respectively correlated with the MAC bridge port configuration data ME and the non-Ethernet service functional termination point ME.

Figure 5:
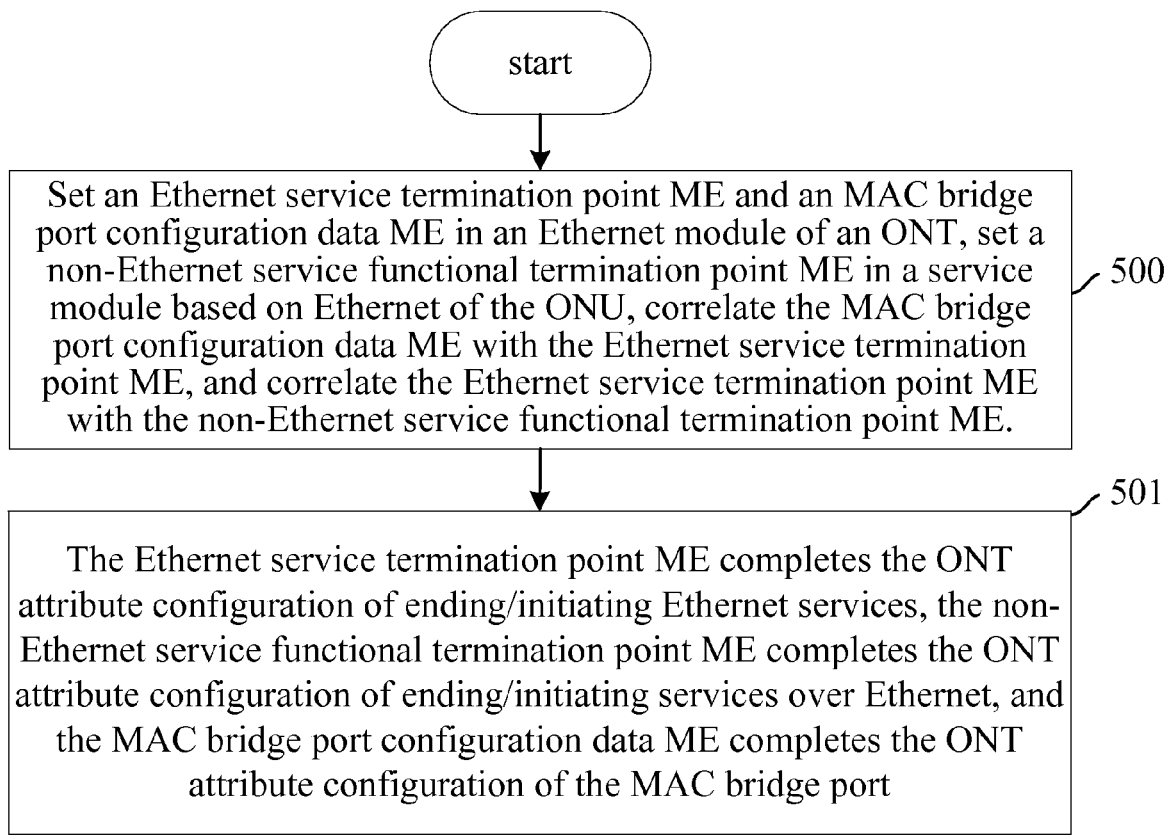
FIG. 5 is a flow chart of an Ethernet service configuration method in a PON according to an embodiment of the present disclosure.

FIG. 5 is a flow chart of an Ethernet service configuration method in a PON according to an embodiment of the present disclosure. The method includes the following steps.

In Step 500, an Ethernet service termination point ME and a MAC bridge port configuration data ME are set in an Ethernet module of an ONT, a non-Ethernet service functional termination point ME is set in a service module based on Ethernet of an ONT, the MAC bridge port configuration data ME is correlated with the Ethernet service termination point ME, and the Ethernet service termination point ME is correlated with the non-Ethernet service functional termination point ME.

In Step 501, the ONT attribute configuration of ending/initiating Ethernet services is completed by the Ethernet service termination point ME, the ONT attribute configuration of ending/initiating services over Ethernet is completed by the non-Ethernet service functional termination point ME, and the ONT attribute configuration of the MAC bridge port is completed by the MAC bridge port configuration data ME.

Figure 6:
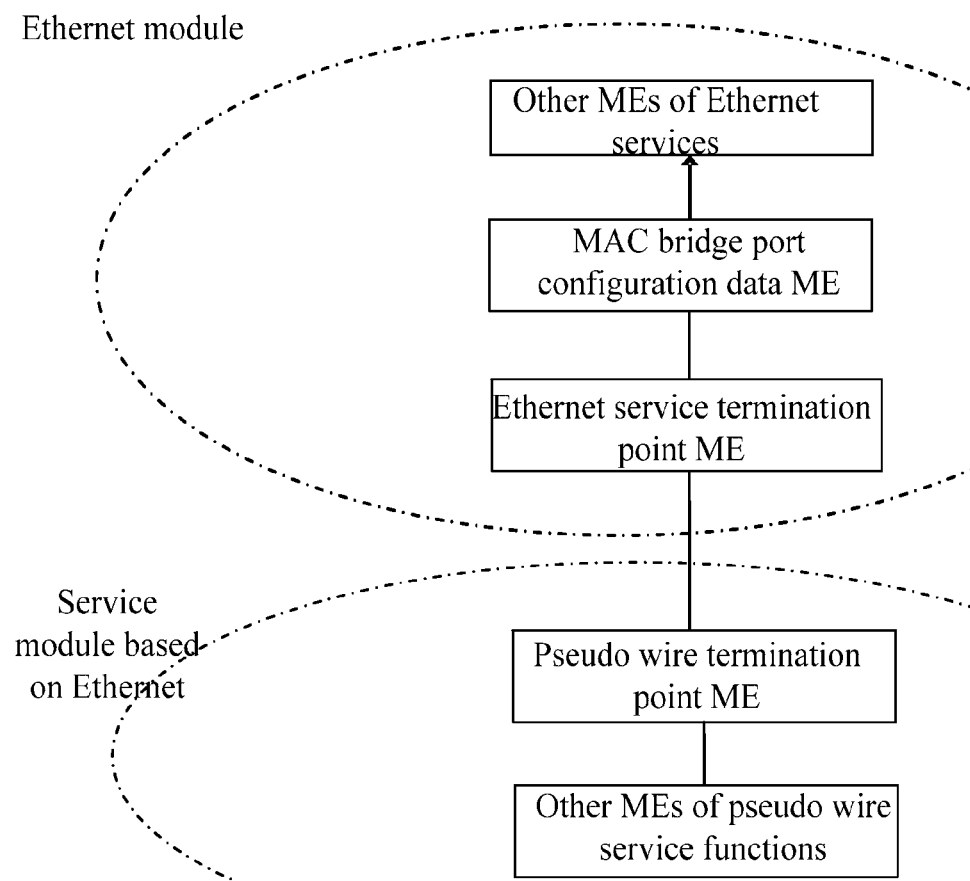
FIG. 6 is a schematic view illustrating Ethernet service configuration in a PON according to an embodiment of the present disclosure.

A specific embodiment is given below for illustrating the present disclosure. Referring to FIG. 6, assuming that the non-Ethernet service functional termination point ME is a pseudo wire termination point ME, a modularization design can be adopted to realize pseudo wire services based on Ethernet services. The Ethernet service termination point ME ends all the attribute configurations related to the Ethernet service and capable of providing other service functions with adaptation, including a termination point interconnection pointer and an Ethernet loop-back configuration attribute. The pseudo wire termination point ME is directly correlated with the Ethernet service termination point ME. In the prior art, the attribute configuration in the Ethernet flow termination point ME can be fulfilled by the Ethernet service termination point ME. In this manner, all the attribute configurations related to the Ethernet services are fulfilled in the Ethernet module, and all the attribute configurations related to the pseudo wire services are fulfilled in the pseudo wire module based on Ethernet. Meanwhile, the loop-back configuration attribute provided by the Ethernet service termination point ME in the Ethernet module realizes the fault detection and maintenance for the Ethernet module of the ONT and the service module of the pseudo wire module based on Ethernet through uplink and downlink loop-backs.

In an embodiment of the present disclosure, a PON system including an OLT and at least one PON element connected with each other is provided. The PON element has an Ethernet service termination point ME and a non-Ethernet service functional termination point ME correlated with each other.

The PON element is adapted to configure attributes for ending or initiating an Ethernet service according to the Ethernet service termination point ME, and configure attributes of a service over Ethernet according to the non-Ethernet service functional termination point ME.

The OLT is further adapted to send an Ethernet data to the PON element or receive an Ethernet data from the PON element.

The PON element is further adapted to compose data analyzed from the Ethernet data received from the OLT at the Ethernet service functional termination point ME into a data bit stream, or to configure a data bit stream into an Ethernet data at the Ethernet service functional termination point ME and then send the Ethernet data to the OLT.

With technology development, when a new configuration attribute related to Ethernet services is required, it only needs to add this attribute in the Ethernet service termination point ME or further add an ME describing this attribute and make the added ME correlated with the ME in the Ethernet module such as the Ethernet service termination point ME and the MAC bridge port configuration data ME. When an attribute is to be configured for a newly added service over Ethernet, it only needs to add a configuration attribute into the non-Ethernet service functional termination point ME in the service module based on Ethernet or add an ME describing this attribute and make the added ME correlated with the ME in the service module based on Ethernet, such as the non-Ethernet service functional termination point ME. In this manner, the basic principle of designing the OMCI in the BPON and GPON systems is achieved, i.e., "the OMCI is defined for realizing modularization and expandability so as to meet demands from different levels". Therefore, the method of the present disclosure may reduce the cost and improve the operability and maintainability of the PON.

Though the objectives, technical schemes, and beneficial effects of the present disclosure have been disclosed above by the embodiments, they are not intended to limit the present disclosure. Any modifications, equivalent substitutions, and variations made within the principle of the present disclosure fall within the scope of the present disclosure.

What is claimed is:

1. A passive optical network (PON) element, which is an optical network terminal (ONT), comprising:
    a PON protocol processing module;
    an Ethernet module connected to the PON protocol processing module and comprising a media access control (MAC) bridge port configuration data management entity (ME) and an Ethernet service termination point ME, wherein the Ethernet service termination point ME is directly connected to the MAC bridge port configuration data ME, and the Ethernet the MAC bridge port configuration data ME is adapted to configure a MAC bridge port and the Ethernet service termination point ME is adapted to configure parameters for ending or initiating an Ethernet service, the parameters comprising a MAC address of the ONT, a remote MAC address, and strategies of adding virtual local area network (VLAN) tags to an uplink frame; and
    at least one service module based on Ethernet connected to the PON protocol processing module via the Ethernet module and comprising at least one non-Ethernet service functional termination point ME correlated with the Ethernet service termination point ME, wherein the at least one non-Ethernet service functional termination point ME is adapted to configure parameters of a service over Ethernet that are used to support a transmission of the non-Ethernet service over Ethernet in Giga-bit PON (GPON) packet transmission;
    wherein each of the MAC bridge port configuration data ME, the Ethernet service termination point ME and the non-Ethernet service functional termination point ME is a basic unit of a management information base (MIB);
    wherein the at least one non-Ethernet service functional termination point ME is connected to the Ethernet service termination point ME through an internal UNI between the Ethernet module and the at least one service module based on Ethernet, and connected to the MAC bridge port configuration data ME via the Ethernet service termination point ME.

2. The network element according to claim 1, wherein the non-Ethernet service functional termination point ME is a time-division multiplexing (TDM) service termination point ME, a pseudo wire termination point ME, or an Multimedia over Coax Alliance (MoCA) termination point ME.

3. The network element according to claim 2, wherein the non-Ethernet service functional termination point ME is correlated with the Ethernet service termination point ME in an explicit or implicit mode.

4. The network element according to claim 3, wherein in the explicit mode, the Ethernet service termination point ME is linked to the correlated non-Ethernet service functional termination point ME through a pointer, or the non-Ethernet service functional termination point ME is correlated with the Ethernet service termination point ME through a pointer.

5. The network element according to claim 3, wherein in the implicit mode, the Ethernet service termination point ME is correlated with the non-Ethernet service functional termination point ME through identical ME identities that identify application examples of the Ethernet service end node ME and the non-Ethernet service functional termination point ME.

6. The network element according to claim 2, wherein the Ethernet service functional termination point ME further comprises an Ethernet service loop-back configuration function; wherein
the Ethernet service loop-back configuration function is adapted to configure a loop-back fault detection of an internal user-network interface (UNI) between the Ethernet service termination point ME and the service module based on Ethernet;
or, the Ethernet service loop-back configuration function is adapted to configure a loop-back fault detection between the Ethernet service functional termination point ME and the MAC bridge port configuration data ME.

7. The network element according to claim 2, wherein the attributes of the Ethernet service termination point ME comprise a termination point interconnection pointer toward the non-Ethernet service functional termination point ME such that the Ethernet service termination point ME is correlated with the non-Ethernet service functional termination point ME through the termination point interconnection pointer.

8. An Ethernet service configuration method in a passive optical network (PON) comprising:
setting an Ethernet service termination point management entity (ME) and a media access control (MAC) bridge port configuration data ME in an Ethernet module of an optical network terminal (ONT), wherein the Ethernet service termination point ME is directly connected to the MAC bridge port configuration data ME;
setting at least one non-Ethernet service functional termination point ME in a service module based on Ethernet of the ONT, wherein the non-Ethernet service functional termination point ME in the service module based on Ethernet is correlated with the Ethernet service termination point ME through an internal user-network interface (UNI) between the Ethernet module and the service module based on Ethernet and connected to the MAC bridge port configuration data ME via the Ethernet service termination point ME;
performing, by the Ethernet service termination point ME, an attribute configuration related to the ending or initiation of an Ethernet service of the ONT, the attribute configuration related to the ending or initiation of an Ethernet service comprising a MAC address of the ONT, a remote MAC address, and strategies of adding virtual local area network (VLAN) tags to an uplink frame;
performing, by the non-Ethernet service functional termination point ME, an attribute configuration on a service over Ethernet of the ONT to support a transmission of the non-Ethernet service over Ethernet in Giga-bit PON (GPON) packet transmission, and
performing, by the MAC bridge port configuration data ME, an attribute configuration on a media access control (MAC) bridge port of the ONT.

9. The method according to claim 8, wherein the non-Ethernet service functional termination point ME is a TDM service termination point ME, a pseudo wire termination point ME, or an MoCA termination point ME.

10. The method according to claim 9, further comprising:
configuring a data bit stream from the service module based on Ethernet into an Ethernet data at the Ethernet service termination point ME, and then sending the data to an optical line terminal (OLT); and composing data analyzed from the Ethernet data received by the Ethernet module from the OLT at the Ethernet service functional termination point ME into a data bit stream, and then sending the data bit stream to the service module based on Ethernet.

11. The method according to claim 9, wherein the non-Ethernet service functional termination point ME is correlated with the Ethernet service termination point ME in an explicit or implicit mode.

12. The method according to claim 9, further comprising:
setting an Ethernet service loop-back configuration function at the Ethernet service termination point ME, wherein
the function is adapted to configure a loop-back fault detection of an internal user-network interface (UNI) between the Ethernet service termination point ME and the service module based on Ethernet;
or, the function is adapted to configure a loop-back fault detection between the Ethernet service functional termination point ME and the MAC bridge port configuration data ME.

13. The method according to claim 9, wherein the non-Ethernet service functional termination point ME is a pseudo wire termination point ME, and the Ethernet service termination point ME comprise a termination point interconnection pointer toward the non-Ethernet service functional termination point ME such that the Ethernet service termination point ME is correlated with the non-Ethernet service functional termination point ME through the termination point interconnection pointer.

14. The method according to claim 9, wherein the Ethernet service termination point ME is correlated with the non-Ethernet service functional termination point ME through identical ME identities that identify application examples of the Ethernet service end node ME and the non-Ethernet service functional termination point ME.

* * * * *